ately, the monoester is derived from a $C_4-C_8$ alphabeta unsaturated dicarboxylic acid and a $C_1-C_{18}$ aliphatic

United States Patent Office 3,586,689
Patented June 22, 1971

3,586,689
ALCOHOL STABLE VINYL ESTER POLYMER LATEXES
Richard G. Nickerson, Harvard, Jack Dickstein and Barry R. Harris, Leominster, Mass., and Samuel Loshaek, Stamford, Conn., assignors to Borden, Inc., New York, N.Y.
No Drawing. Continuation of application Ser. No. 545,548, Apr. 27, 1966. This application Aug. 6, 1969, Ser. No. 849,594
Int. Cl. C08f *15/00, 47/18, 45/34*
U.S. Cl. 260—29.6         15 Claims

ABSTRACT OF THE DISCLOSURE

This invention relates to a process for preparing a latex adhesive which is stable in the presence of alcoholic thinning materials. More particularly, the invention comprises a process for polymerizing a vinyl ester in the presence of a monoalkyl ester stabilizing agent for alcoholic thinners. Thereafter, alcoholic thinners are added to the latex. The invention also contemplates the latex adhesive made by the above process.

This application is a continuation of application Ser. No. 545,548, filed Apr. 27, 1966, and now abandoned.

This invention relates to polymers of ethenoid monomers and their polymerization process. More particularly it relates to latexes of vinyl ester polymers and interpolymers thereof which are stable in the presence of alcoholic or hydroxylic solvents.

Vinyl ester polymers and especially vinyl acetate polymers are known to be good adhesives for cellulosic products such as wood and paper. In order to enhance the usability of such water-based adhesive, latexes comprising vinyl acetate polymers are preferably plasticized with non-volatile materials; this greatly increases the viscosity of the latex. Therefore, efficient use of the adhesive requires that the plasticized latex be diluted with a thinning material. One type of thinning material which provides highly desirable latex adhesives are hydroxylic compounds, specifically, alcohols. These thinners are advantageous for the latex adhesive due to, their compatibility with water; their relatively low vaporization temperature which greatly improves the evaporation rate of water from the adhesive while it is being set, as for example, between two sheets of wood to form plywood; their plasticizing action on the polymer itself, and; their limited solvent action on the polymer in the latex thereby contributing to penetration of the cellulose surface by the adhesive which results in superior adhesive properties.

Use of alcoholic thinners are severely limited, however, by the nature of the polymer since vinyl ester polymers tend to coagulate in the presence of the hydroxylic compounds. Coagulated latexes are not suited for adhesive use in cellulosic materials.

The present invention provides a process for preparing a latex adhesive which is stable in the presence of alcoholic thinning materials. The invention further provides the latex and the alcohol-stable latex adhesive which is suitable for adhering cellulosic materials.

Briefly stated, the invention comprises an aqueous emulsion polymerization process for monomers including vinyl esters, and preferably vinyl acetate in which process it is critical to have a stabilizing agent for alcoholic thinners which is reactable with said monomers in proportion of about .01–15 parts by weight of agent for 100 parts by weight of the monomers present.

As to the materials, the ethenoid monomer may be vinyl esters such as vinyl acetate, vinyl butyrate, and also branched esters such as 2-hexyl vinyl octanoate, 2-ethyl, 2-propyl vinyl pentanoate, and up to $C_{16}$ aliphatic vinyl esters. The number of carbon atoms refers to the aliphatic moiety attached to the carbonyl group of the ester, i.e., vinyl acetate is $C_1$. The ester may be present in proportion of up to at least 50% by weight of the resulting polymer. Vinyl acetate and/or other vinyl esters described may be the only monomer component or there may be included monomers copolymerizable with the vinyl esters. Examples of copolymerizable monomers include $C_3-C_8$ alpha-beta unsaturated carboxylic acids, as for example, maleic acid, itaconic acid, fumaric acid, methylene malonic, mesaconic, crotonic, alpha-methylcrotonic, non-reactive halogen and other derivatives of said acids, and the like. Other monomers are $C_1C_{18}$ aliphatic fully esterified esters of said $C_3-C_8$ acids, as for example, dibutyl maleate, distearyl itaconate, dioctyl maleate, dibutyl maleate, dibutyl fumarate, fumarate, didecyl maleate, distearyl itaconate, didodecyl fumarate, didodecyl maleate, butyl alpha-methylcrotonate, mixed diesters and the like, as for example, butylhexyl maleate. Also, acrylic and methacrylic comonomers are usable including the respective acids, and $C_1-C_8$ aliphatic esters of said acrylic and methacrylic acids.

As to the stabilizing agent, it has been found that monoalkyl esters of alpha-beta unsaturated dicarboxylic acids cannot be eliminated, nor substituted for, in this process. The monoester is derived from a $C_4-C_8$ alpha-beta unsaturated dicarboxylic acid and a $C_1-C_{18}$ aliphatic alcohol. The esterified product of the acid and alcohol is herein referred to as $C_1-C_{18}$ monoalkyl esters of $C_4-C_8$ alpha-beta unsaturated dicarboxylic acids. Examples of the monoesters include: monobutyl maleate, monoethyl maleate, monooctyl itaconate, monooctyl maleate, monododecyl fumarate, monobutyl alpha-methylene adipate, and the like. The preferred monoester stabilizing agents are the lower ($C_1-C_6$) alkyl monoesters of maleic and fumaric acid and within this group monobutyl maleate is preferred because of its ease of manufacture, as for example, from butanol and maleic anhydride in which relatively simple vacuum stripping results in this monoester. Also, the monobutyl ester does not undergo as rapid disproportionation to dicarboxylic acid and diester as do other lower alkyl monoesters.

The catalyst for the polymerization process is any water-soluble peroxy catalyst generally used in ethenoid bond polymerization such as hydrogen peroxide, potassium persulfate and ammonium persulfate or mixtures of water- and oil-soluble peroxy catalysts. Oil-solubles include, for example, organic peroxides such as benzoyl peroxide, t-butyl hydroperoxide, p-menthane hydroperoxide, and the like. Also included in this group of catalysts are the redox catalyst systems wherein a peroxide-reducing agent system is used. Examples include potassium and ammonium persulfate in combination with sodium bisulfite or sodium metabisulfite.

Other components of the polymerization system may include surfactants such as sodium alkyl sulfonates, sodium alkylaryl sulfonates, dialkyl succinato sodium sulfonic acid salts, polyethyleneoxy terminated alkyl phenols, polyethyleneoxy terminated alkanols; protective colloids such as hydroxyethyl cellulose, polyvinyl alcohol, sodium alginate, starch; chain transfer agents such as chloroform, acetaldehyde, butyraldehyde; and chain cross-linking agents such as diallyl maleate and ethylene glycol dimethacrylate.

Adhesive latexes are best utilized when the particle size in the latex is small so that the overall appearance of the latex is that of a smooth milky liquid. Generally, particle size is maintained below about 2 microns, and for best results, in the range of .5–1 micron. In order to achieve the desired particle size, protective colloids are added and the polymerization process proceeds in its presence. Especially useful in this polymerization process is polyvinyl alcohol in high proportions as the protective colloid affording the best results. It is used in proportion of between at least 2% and up to 10% and greater on the weight of monomers. In addition, the particle size is affected by the molecular weight of the polyvinyl alcohol used. Lower molecular weight polyvinyl alcohols have been found to favor smaller particle-size formation, whereas, higher molecular weight polyvinyl alcohol has the effect of increasing the particle size of the vinyl ester polymer. Lower molecular weight polyvinyl alcohol is one whose 4 percent solution in water gives 3–7 cps. (Brookfield LVF). The observed effects of the varying molecular weight polyvinyl alcohols are more pronounced as polyvinyl alcohols in extremes of molecular weight are used. Therefore, in order to produce latex particle size of desired dimensions, we have found that about 60–100 parts by weight of lower molecular weight polyvinyl alcohol for 100 parts total of polyvinyl alcohol provide particle size in the range of below about 2 microns. It is understood that the more the molecular weight of the polyvinyl alcohol is in the extreme, the greater the influence it will have on the particle size, and that the proportion of polyvinyl alcohol in the system can be adjusted as needed.

The polymerized monomers in latex form are preferably blended with plasticizers to enhance stability and application thereof by thickening the latex without an appreciable increase of the solids content. The plasticizers are of the usual type, namely substantially non-volatile solvents for the polymer and compatible therewith in the latex system. Examples of the plasticizers include dibutyl phthalate, ethyl butyl phthalate, N-ethyl o- and p-toluenesulfonamide, butyl benzyl phthalate, polymeric ester plasticizers, and the like.

As to proportions, the vinyl esters are present in proportion of at least 50% by weight of the total monomers and preferably in the range of 60–100%. The highly polar acetoxy side groups in the polymer of the vinyl ester provides superior adhesion of the polymer to polar substrates such as cellulosics. This superior adhesion is most pronounced when the proportion of the vinyl ester is high.

The other co-monomers described may be present in proportion of up to 50% by weight of total monomers with the exception of the dicarboxylic acids and acrylic and methacrylic acids. The proportions of the acids has been found to be best maintained below about 10% due to the extraordinary thickening effect of these co-monomers in the interpolymer. Acrylic and methacrylic acids may be used in the upper part of the 10% range, while the other carboxylic acids are best kept in the lower part of the 10% range. For example, thickness of a 55% solids latex in excess of 30,000 centipoise is undesirable. An example of a good interpolymer is about 78% vinyl ester; 20% dialkyl ester, and 2% carboxylic acid. Another example is 100% vinyl ester.

The proportion of the stabilizing agent for alcoholic thinners may be as low as .1% on the weight of total monomers. Proportions greater than 3–5% have not been found to substantially add to the stabilization properties of the latex. However, levels of 12–15% monoalkyl maleate have been incorporated without difficulty.

The proportion of catalyst is preferably maintained at low levels in order to favor higher molecular weight polymers. These have been found to be better suited as adhesives for cellulosic products. Polymer molecular weight ranges which are desirable fall within the range of between about up to 100,000 and as high as 3–4 million and greater. Catalyst proportions are usually maintained in the range of about .01–1 part for 100 parts of monomers and for best results, i.e., highest molecular weight, the proportion of catalyst is maintained below about .5 part. It has been noted, however, that a decrease in catalyst concentration, while increasing the molecular weight may decrease the ease in which polymerization proceeds to substantial completion.

As to the proportion of other additives, they are used in the usual proportions, as for example surfactants at 0–2%, chain transfer agents at 0–.5%, and; chain crosslinking agents at 0–1%.

In the following table the proportional ranges of the primary components are set forth in columns as Recommended which provides the optimum range of proportions for the best results, and the Illustrative column which provides an expanded range in which the degree of efficiency of the invention is reduced.

TABLE I

| Materials | Parts for 100 parts monomer | |
|---|---|---|
| | Recommended | Illustrative |
| Vinyl ester | 60–100 | 50–100 |
| Comonomers | 0.40 | 0–50 |
| Stabilizing agent | .1–3 | .01–15 |
| Protective colloid | 4–7 | 3–10 |
| Catalyst | .02–.1 | .01–1 |
| Plasticizer (on basis of polymer solids) | 0–40 | 0–200 |

As to the process generally, a water solution of surfactant and other additives together with the protective colloid, such as polyvinyl alcohol is prepared. Into the aqueous solution are added and emulsified therein, the premixed monomers and the monoalkyl ester. Catalyst is added in the proportions needed for the required molecular weight and moderate heat is applied, as for example the temperature is maintained in the range of about 60°–80° C. until polymerization is substantially complete. Residual unreacted monomer of about .1–.5% indicates essentially complete reaction. It has been found that the time required in a small batch operation is approximately 3–6 hours to produce a polymer in the molecular weight range of about 1,000,000. After polymerization is complete the batch is cooled. The solids content of the resulting latex can be varied as desired, however, we have found that the best results for the intended adhesive use hereinafter described is in the range of about 50–58% and the optimum solids content is about 55%.

In the preferred embodiment of this invention, the latex as made has admixed therewith plasticizer to enhance the application and workable properties of the latex. Also included in the adhesive formulation is the alcoholic thinner described. Addition of the thinner, such as denatured ethyl alcohol (5% isopropyl, 95% ethyl alcohol), isopropyl alcohol and the like in the proportion of up to about 50% of the latex weight does not result in coagulation of the latex of this invention.

The plasticizer may be added to the latex by a gradual addition technique using moderate agitation. The alcohol is added as for example, by stirring it slowly into the plasticized latex.

In application of the adhesive to cellulosic products, such as wood or paper laminates, the adhesive may be applied by a doctor-knife or even as a spray through a small orifice or slit. Heat is not required to obtain a rapid set and high levels of wet strength and as a result, operation on automatic equipment is favored. In special cases, particularly for wood laminates some clamp time may be used to advantage; however, wood to paper laminates are made with rapidly developing wet strength bonds. In the examples that follow and elsewhere herein, proportions are expressed as parts by weight unless specifically stated to the contrary.

EXAMPLE 1

Into a 3-liter, 3-neck flask equipped with mechanical stirrer, reflux condenser, monomer addition funnel, and inlet lines for catalyst feed and reducing agent feed, while stirring, was added 560 gms. of water and 5.2 gms. of anionic surfactant, sodium alkylaryl polyether sulfonate, (sold commercially by Rohm and Haas Co. as Triton X-200, 28% solids). To the stirred solution was slowly added 23 gms. of low molecular weight polyvinyl alcohol (4 percent solution: 5 cps. 1/60; Brookfield visc.) and 8 gms. of medium molecular weight polyvinyl alcohol (4 percent solution: 22 cps. 1/60 Brookfield visc.). The temperature was raised to 50° C. and held for about 30 minutes until the additives dissolved. The system was purged with nitrogen and a nitrogen blanket was established for the run.

To the stirred water phase was added a mixture consisting of 793.5 gms. of vinyl acetate and 8 gms. of monobutyl maleate over about 1½ hours. From the catalyst feed reservoir there was added a mixture containing .44 gm. of sodium bicarbonate, and .3 gm. of ammonium persulfate in 37 gm. of water. At the same time from the reducing agent reservoir there was added a solution of .22 gm. of sodium bisulfite in 37 gm. of water. The batch was heated to about 70° C. and held there for about 4–5 hours and then cooled to room temperature.

The product latex was at 56% solids, 4.2 pH, .3% residual monomer, and had a viscosity of 1120 cps. (3/30 r.p.m. LVF Brookfield). Molecular weight was about 1,000,000.

The latex was compounded with dibutyl phthalate in varying proportions including 2–30% and also with denatured alcohol in varying proportions including 2–40%; the percentages being on the weight of the latex. The adhesive has high wet tack, and the high molecular weight adhesive is particularly adaptable for use with paper, wood and other cellulosic and polar substrates; it has excellent stability at elevated temperatures. Its relatively low viscosity affords easy spreading or spraying; its high wet tack and fast break allows rapid feeds on automatic application equipment. The latex was completely stable on adding the denatured alcohol and mixing.

In a comparison, an adhesive composition was prepared with the same proportions of polyvinyl alcohol, but without the stabilizing agent of this invention. The composition coagulated when denatured alcohol was added, and when used as an adhesive without the denatured alcohol, the paper-paper tear on peel was 30–60 seconds, compared to 10–20 seconds for the latex described.

EXAMPLE 2

Into a 3-liter, 3-neck flask equipped with mechanical stirrer, reflux condenser, monomer addition funnel, and inlet lines for catalyst feed and reducing agent feed while stirring, was placed 560 gms. of water and 1.8 gms. of sulfated fatty acid-soap mixture (sulfated oleic acid-ester mixture). Then added slowly with mixing was 20 gms. of low molecular weight polyvinyl alcohol and 16 gms. of medium molecular weight polyvinyl alcohol. The temperature was raised to 50° C. and held for about 30 minutes. The system was purged with nitrogen for about 10–15 minutes and left under nitrogen blanket.

To the stirred water phase was added a mixture of 396.6 gms. of vinyl acetate and 4 gms. of monobutyl maleate over a 30 minute period. From the catalyst feed reservoir was added a solution of .44 gm. of sodium bicarbonate, and .3 gm. of ammonium persulfate in 37 gms. of water. At the same time from the reducing agent reservoir there was added a solution of .22 gm. of sodium bisulfite in 37 gms. of water. The batch was heated to reflux. After about 1½ hours of reflux an additional monomer mixture of 396.6 gms. of vinyl acetate and 4 gms. of monobutyl maleate was gradually to the system added over about 2 hours. After a total of about 5–6 hours of reflux the batch temperature rose to 80–90° C. which indicated complete reaction.

The product at 56.3% solids, 4.4 pH, a .5% residual monomer, had a viscosity of 1600 cps. (3/30 r.p.m. LVF Brookfield). Molecular weight was high.

The latex product with 8 parts dibutyl phthalate, 15 parts denatured alcohol, and 8 parts water, per 100 parts of latex gave a low viscosity, fast setting, laminating adhesive that did not coagulate. Unlike this product, a comparable run made without monobutyl maleate; it coagulated when 15 gms. of denatured alcohol was stirred into 100 gms. of latex.

EXAMPLE 3

Into a 10-gallon stainless steel reactor charge was 14 pounds of water, .05 pound of sodium dihexyl sulfosuccinate (sold commercially by American Cyanamid Company as Aerosol MA) and while stirring, there was added .48 pound of low molecular weight polyvinyl alcohol (sold commercially by The Borden Chemical Company as Lemol 5–88), and .3 pound of medium molecular weight polyvinyl alcohol (sold commercially by The Borden Chemical Company as Lemol 22–88). The temperature was raised to 50° C., held for about 30 minutes and then purged with nitrogen. A nitrogen blanket was left in the reactor throughout the run.

With agitation there was added to the batch a solution of 20 pounds of vinyl acetate and .2 pound of monoethyl maleate over a 1-hour period. To the batch was added a solution of .01 pound of sodium bicarbonate, .008 pound of ammonium persulfate in 1 pound of water over 4 hours, and at the same time from a separate supply, a solution of .005 pound of sodium bisulfite in 1 pound of water over 4 hours. As the redox system feeds were started, the batch temperature was raised to reflux. Cooling was applied as needed but reflux was maintained. In 4–6 hours the reflux temperature rose to 80–90° C. indicating reaction was complete. The product had 56.5% solids, 1000 cps. viscosity and 4.2 pH. It had excellent stability to added denatured alcohol, isopropyl alcohol, carbon tetrachloride, benzene, toluene and plasticizers like dibutyl phthalate and butyl benzyl phthalate alone or in combination.

EXAMPLE 4

In Example 3, replacement of 25% of the weight of vinyl acetate by dibutyl maleate, and substitution of monobutyl maleate at .1 pound for the .2 pound of monoethyl maleate gave a latex with excellent stability to added hydroxylic solvents (alcohols).

EXAMPLE 5

In Example 3, replacement of 40% of the weight of vinyl acetate by dibutyl maleate and substitution of .4 pound of monooctyl maleate for the .2 pound monoethyl maleate gave a latex with excellent compounding properties with hydroxylic solvents and plasticizers. The product when combined with usual plasticizer such as dibutyl phthalate or butyl benzyl phthalate serves as a laminating adhesive of polyvinyl chloride films to substrates including paper, wood, plaster board, transite, leather, plastics, etc. As high as 15–20 pounds peel strength (1 inch wide film) was observed using an Instron tensile tester. The high level of latex mechanical stability provides a high degree of flexibility in the use of automatic equipment.

EXAMPLE 6

In Example 5, replacement of the .4 pound of monooctyl maleate by .05 pound of monobutyl maleate gave an equally useful product.

EXAMPLE 7

The process of Example 1 is repeated except that the other copolymerizable monomers herein described, and in the proportions disclosed, are substituted for a portion the vinyl acetate. The resulting latexes are stable when alcohol solvents are admixed therewith.

EXAMPLE 8

The process of Example 1 is repeated except that the other solvent stabilizing agents herein described, and in the proportions disclosed are substituted for the monobutyl maleate. The resulting latexes are stable when alcohol solvents are admixed therewith.

We claim:
1. A stable aqueous latex adhesive composition comprising:
   (A) a polymeric reaction product having a molecular weight of from 100,000 to 4 million, said reaction product comprising:
      (1) vinyl ester monomer in proportion of 50 to 100 parts by weight for 100 parts by weight of (1) and (2); said ester selected from the group consisting of $C_1$–$C_{16}$ aliphatic vinyl esters;
      (2) a monomer copolymerizable with said vinyl ester in proportion of 0 to 50 parts by weight for 100 parts by weight of (1) and (2), said copolymerizable monomer selected from the group consisting of:
         (a) $C_3$–$C_8$ alpha-beta unsaturated carboxylic acids;
         (b) $C_1$–$C_{18}$ aliphatic fully esterified ester of said $C_3$–$C_8$ acids; and
         (c) mixtures of (a) and (b);
      (3) a stabilizing agent selected from the group consisting of a $C_1$–$C_{18}$ mono alkyl ester of a $C_4$–$C_8$ alpha, beta- unsaturated dicarboxylic acid in proportion of 0.01 to 15 parts by weight for 100 parts by weight of (1) and (2);
   (B) a surfactant, plasticizer and protective colloid; and
   (C) an alcoholic thinning material in proportion of from 2 to 40 parts by weight of said thinner for 100 parts by weight of latex.

2. The process of making a latex adhesive composition which is stable in the presence of alcoholic thinning materials comprising the steps of:
   (A) admixing into an aqueous medium, a surfactant and a protective colloid;
   (B) emulsifying in the admixture:
      (1) a vinyl ester in proportion of 50 to 100 parts by weight for 100 parts by weight of (1) and (2), said ester selected from the group consisting of $C_1$–$C_{16}$ aliphatic vinyl esters; and
      (2) a monomer copolymerizable with said vinyl ester monomer, in proportion of from 0 to 50 parts by weight for 100 parts by weight of (1) and (2), said copolymerizable monomer selected from the group consisting of:
         (a) $C_3$–$C_8$ alpha, beta- unsaturated carboxylic acids;
         (b) $C_1$–$C_{18}$ aliphatic fully esterified esters of said $C_3$–$C_8$ acids, and
      (3) a stabilizing agent, said stabilizing agent selected from the group consisting of $C_1$–$C_{18}$ mono alkyl esters of $C_4$–$C_8$ alpha- beta unsaturated dicarboxylic acids in proportion of from 0.01 to 15 parts by weight for 100 parts by weight of (1) and (2);
   (C) admixing a catalyst and heating the medium until polymerization is substantially complete and a latex is formed; and
   (D) admixing into the latex:
      (d1) plasticizer, and
      (d2) an alcoholic thinner in proportion of from 2 to 40 parts by weight of said thinner for 100 parts by weight of latex.

3. The process of claim 2, wherein said vinyl ester is vinyl acetate.

4. The process of claim 2, wherein the catalyst is used in an amount of from 0.1 to 1.0 part by weight for 100 parts by weight of (1) and (2).

5. The composition of claim 1, wherein the catalyst is used in an amount from 0.02 to 0.1 part by weight for 100 parts by weight of (1) and (2).

6. The process of claim 2, wherein said protective colloid is present in an amount of from 3 to 10 parts by weight for 100 parts by weight of (1) and (2).

7. The process of claim 6, wherein said protective colloid is polyvinyl alcohol.

8. The process of claim 2, wherein the heating step is carried out until the residual unreacted monomers are no greater than about 0.5% by weight of the initial portion of said monomers.

9. The process of claim 2, wherein the polymer thus formed has molecular weight from 100,000 to 4 million.

10. A method for making an adhesively bonded surface which comprises applying to at least one of said surfaces the adhesive composition of claim 1 and contacting said adhesive applied surface with another surface.

11. Adhesively bonded surfaces comprising an adhesive disposed between said surfaces, said adhesive comprising the adhesive composition of claim 1.

12. The latex composition of claim 1, wherein the proportion of said vinyl ester monomer is 100 parts by weight for 100 parts of (1) and (2).

13. A laminated article comprising polyvinyl chloride film and the latex adhesive composition of claim 1 as the laminating adhesive.

14. The latex adhesive composition of claim 1, wherein the stabilizing agent is selected from the group consisting of a $C_1$–$C_6$ alkyl mono ester of maleic and fumaric acid.

15. The process of claim 2, wherein the stabilizing agent is selected from the group consisting of $C_1$–$C_6$ alkyl mono esters of maleic and fumaric acid.

References Cited
UNITED STATES PATENTS

| | | | |
|---|---|---|---|
| 2,662,863 | 12/1953 | Bristol et al. | 260—29.6(WA) |
| 2,806,020 | 9/1957 | Scott et al. | 260—29.6(WU) |
| 3,231,534 | 1/1956 | Blades et al. | 260—29.6(H) |

MURRAY TILLMAN, Primary Examiner

W. J. BRIGGS, SR., Assistant Examiner

U.S. Cl. X.R.

156—327, 332; 161—250, 252; 60—33.4, 78.5, 875